(12) United States Patent
Pollock et al.

(10) Patent No.: US 11,885,120 B2
(45) Date of Patent: *Jan. 30, 2024

(54) CONSTRUCTION MATERIALS WITH ENGINEERED SOUND ATTENUATING PROPERTIES AND METHODS THEREFOR

(71) Applicant: Oceanit Laboratories, Inc., Honolulu, HI (US)

(72) Inventors: Jacob Kumar Pollock, Honolulu, HI (US); Raphael Rodriguez, Honolulu, HI (US); Bryce Davis, Honolulu, HI (US); Erika Brown, Honolulu, HI (US); El Hadj Fofana, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/402,445

(22) Filed: Aug. 13, 2021

(65) Prior Publication Data

US 2022/0389707 A1    Dec. 8, 2022

Related U.S. Application Data

(63) Continuation-in-part of application No. 15/785,363, filed on Oct. 16, 2017, now Pat. No. 11,105,091.
(Continued)

(51) Int. Cl.
*G10K 11/165* (2006.01)
*F16F 7/104* (2006.01)
(Continued)

(52) U.S. Cl.
CPC .................. *E04B 1/84* (2013.01); *C09D 7/40* (2018.01); *C09D 121/00* (2013.01);
(Continued)

(58) Field of Classification Search
CPC ...... E04B 1/84; E04B 1/98; E04B 2001/8457; E04B 2103/02; G10K 11/165;
(Continued)

(56) References Cited

U.S. PATENT DOCUMENTS 4,923,034 A    5/1990  Okuzawa
5,356,958 A   10/1994  Matthews
(Continued)

FOREIGN PATENT DOCUMENTS

CN           1318826 A  * 10/2001
WO   WO-2023018422 A1  *  2/2023   ........... C09D 121/00

OTHER PUBLICATIONS

Non-Final Office Action dated Mar. 26, 2020, issued in U.S. Appl. No. 15/785,363; 7 pages.
(Continued)

*Primary Examiner* — Edgardo San Martin
(74) *Attorney, Agent, or Firm* — Fresh IP PLC; Clifford D. Hyra; Aubrey Y. Chen

(57) ABSTRACT

A sound attenuation material includes a plurality of particles, each having a core and an elastic or compliant coating around the core, and a matrix surrounding the plurality of particles, the matrix being less dense than the core. A method of manufacturing sound attenuating materials includes adding an elastic or compliant coating to core particles and drying and/or curing the coating, mixing the coated core particles into a matrix material, and pouring the mixture into a mold. The core particles are denser than the matrix material.

25 Claims, 9 Drawing Sheets

Related U.S. Application Data

(60) Provisional application No. 62/408,666, filed on Oct. 14, 2016.

(51) Int. Cl.

| | | |
|---|---|---|
| *E04B 1/98* | (2006.01) | |
| *B32B 5/14* | (2006.01) | |
| *B32B 5/16* | (2006.01) | |
| *E04B 1/84* | (2006.01) | |
| *C09D 183/04* | (2006.01) | |
| *C09D 175/04* | (2006.01) | |
| *C09D 7/40* | (2018.01) | |
| *C09D 121/00* | (2006.01) | |

(52) U.S. Cl.
CPC ......... *C09D 175/04* (2013.01); *C09D 183/04* (2013.01); *E04B 2001/8457* (2013.01); *E04B 2103/02* (2013.01)

(58) Field of Classification Search
CPC .... G10K 11/162; G10K 11/16; B29C 70/025; F16F 7/10; F16F 7/104; B32B 5/14; B32B 5/147; B32B 5/16; B32B 5/30; C09D 7/40; C09D 121/00; C09D 175/04; C09D 183/04
See application file for complete search history.

(56) References Cited

U.S. PATENT DOCUMENTS

| | | | |
|---|---|---|---|
| 5,564,241 A | 10/1996 | Ogorchock | |
| 5,718,643 A | 2/1998 | Wright | |
| 5,916,681 A * | 6/1999 | Cipin | C04B 26/02 428/407 |
| 6,042,485 A | 3/2000 | Cheng | |
| 6,576,333 B2 | 6/2003 | Sheng | |
| 7,205,043 B1 | 4/2007 | Spero | |
| 7,249,653 B2 | 7/2007 | Sheng | |
| 7,263,028 B2 | 8/2007 | Thomas | |
| H2237 H | 4/2010 | Barrett | |
| 7,837,008 B1 | 11/2010 | Lane | |
| 9,038,619 B1 | 5/2015 | Kempf | |
| 9,076,429 B2 | 7/2015 | Islam | |
| 9,099,074 B1 | 8/2015 | Lucon | |
| 9,393,493 B2 | 7/2016 | Danny | |
| 9,464,001 B2 | 10/2016 | Mitchell | |
| 9,788,446 B1 | 10/2017 | Townsend | |
| 10,247,707 B1 | 4/2019 | Pollock | |
| 10,254,424 B1 | 4/2019 | Pollock | |
| 10,480,189 B2 | 11/2019 | Zheng | |
| 10,694,466 B2 | 6/2020 | Banerjee | |
| 11,105,091 B1 * | 8/2021 | Pollock | B32B 27/065 |

OTHER PUBLICATIONS

Final Office Action dated Dec. 24, 2020, issued in U.S. Appl. No. 15/785,363; 9 pages.

Notice of Allowance and Fees Due, dated Apr. 29, 2021, issued in U.S. Appl. No. 15/785,363; 8 pages.

* cited by examiner

CONSTRUCTION MATERIALS WITH ENGINEERED SOUND ATTENUATING PROPERTIES AND METHODS THEREFOR

CROSS-REFERENCE TO RELATED APPLICATIONS

This application is a continuation-in-part of U.S. application Ser. No. 15/785,363, filed Oct. 16, 2017, which claims the benefit of U.S. Provisional Application No. 62/408,666, filed Oct. 14, 2016, each of which is hereby incorporated by reference in its respective entirety.

FIELD OF THE DISCLOSURE

The application relates to the field of construction materials, and more particularly to sound attenuating construction materials.

BACKGROUND

Existing sound attenuation materials are expensive to manufacture and install, have high mass and/or weight, and/or fail to provide adequate sound attenuation.

As such, needs exist for improved sound attenuation materials.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A new sound attenuation material includes a plurality of particles, each comprising a core and an elastic or compliant coating around the core, and a matrix surrounding the plurality of particles, where the core is denser than the matrix. The core may also be denser than the elastic or compliant coating. The elastic or compliant coating may include filler material having a density lower than that of the matrix, such as polymer or glass micro-balloons. The particles may be spherical or another shape, such as irregular shards, and may be of various shapes. The plurality of particles may include several different masses of particles. The matrix may be a construction material. The matrix may include gypsum, cement, concrete, polymer, or ceramic. The matrix may be foamed. The matrix may include reinforcing fillers, which may include one or more of polypropylene fibers, gravel, sand, carbon nanotubes, starch additives, paper fibers, and glass fibers.

The core of at least one of the plurality of particles may be metal, mineral, or ceramic (e.g., steel or tungsten). The elastic coating of at least one of the plurality of particles may be an elastomeric polymer. The elastic coating of at least one of the plurality of particles may be polyurethane, silicone, or rubber.

The core of at least one of the plurality of particles may have a diameter of 10 nm to 100 cm and density of 2.0 to 20 g/cc, and the elastic coating of the at least one of the plurality of particles may have a thickness of 10 nm to 20 mm, an elastic modulus of 0.005-0.5 GPa, and a density of 0.01 to 2.0 g/cc. In some embodiments, the core of the at least one of the plurality of particles has a diameter of 1 mm to 5 cm, and the elastic coating of the at least one of the plurality of particles has a thickness of 0.1 mm to 10 mm, an elastic modulus of 0.01 to 0.1 GPa, and a density of 0.05 to 0.3 g/cc.

A new method of manufacturing sound attenuating materials includes adding an elastic or compliant coating to core particles and drying and/or curing the coating, mixing the coated core particles into a matrix material, and pouring the mixture into a mold. The core particles are denser than the matrix material and may also be denser than the elastic or compliant coating. The method may also include drying the mixture. The core particles may have a range of masses. Each mass of core particle corresponds to a resonant frequency, and the masses of the core particles are selected based on pre-selected frequencies to be attenuated by a final construction material. The proportion of each mass core particle is selected based on a predetermined desired level of attenuation at the corresponding resonant frequency. The method may also include foaming the matrix material by air- or gas-entrainment, blowing agents, polyurethane reactions, or vacuum application.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
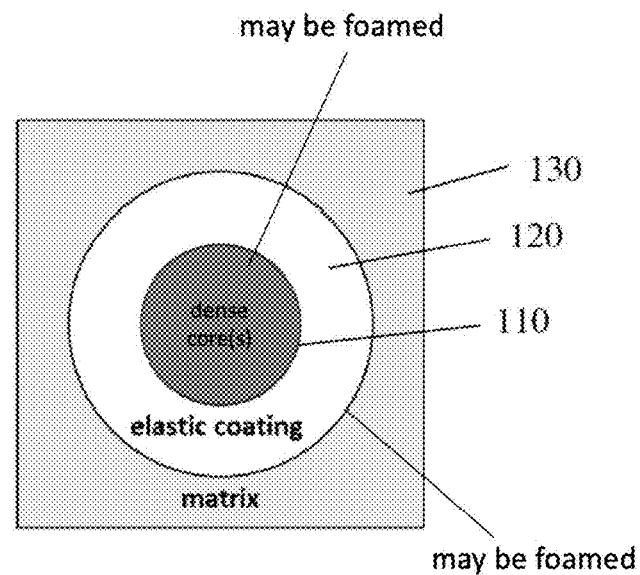
FIG. 1 illustrates a composite material with designer filler material for sound attenuation, according to an embodiment of the present invention.

This application details construction materials with engineered sound attenuating properties, and methods therefor, in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In embodiments of the present invention, sound absorbing panels, coatings, and foams are created through incorporation of designer filler materials. The fillers are layered particulates with specific geometries and mechanical properties that impart particular sound attenuating properties.

FIG. 1 illustrates a composite material with designer filler material for sound attenuation, according to an embodiment of the present invention. As shown in FIG. 1, the particles consist of a dense core 110 (which may or may not be foamed) surrounded by an elastic or compliant coating 120 (which may or may not be foamed). They are characterized by their layered structure and mechanical properties. The particles act as locally resonant structures within a surrounding matrix 130.

Figure 2A:
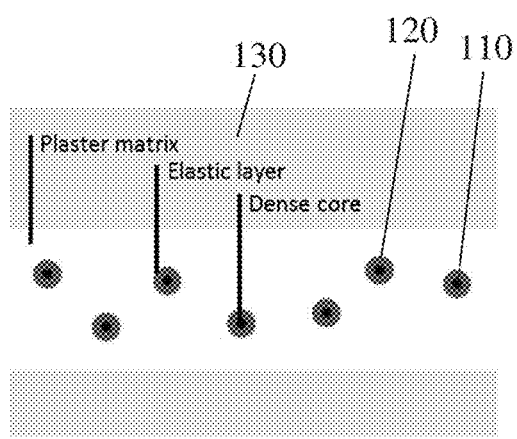
FIG. 2A illustrates a composite sound-attenuating panel, according to an embodiment of the present invention.

FIG. 2A illustrates a composite sound-attenuating panel, according to an embodiment of the present invention. FIG. 2A shows particles such as those illustrated in FIG. 1, where the surrounding matrix 130 is configured into a plaster board, which may be used as a building material. The dense core 110 can oscillate within the elastic coating 120, which is positioned in the matrix 130, attenuating sound energy depending on its frequency as shown in FIG. 2B.

Figure 2B:
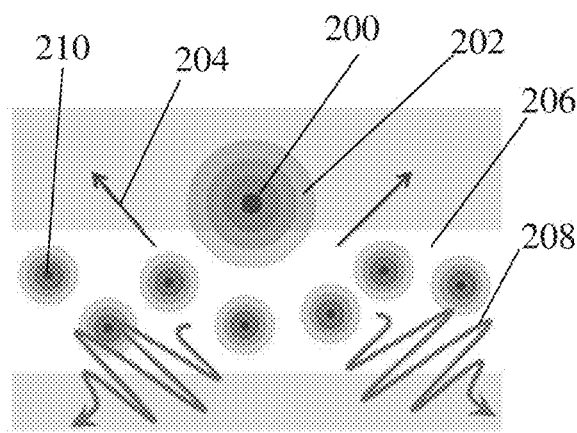
FIG. 2B illustrates sound attenuation in the composite panel of FIG. 2A, according to an embodiment of the present invention.

FIG. 2B illustrates sound attenuation in the composite panel of FIG. 2A, according to an embodiment of the present invention. At and around the resonant frequency of the dense cores, the cores vibrate, absorbing the sound energy and transforming it into kinetic energy, reducing the sound energy which is delivered to the other side of the matrix (e.g., plaster board). In FIG. 2B, the sound source 200 is emitting a sound 202, which is partially reflected 204 by the board 206 and partially transmitted 208 through the board. However, the transmitted sound energy 208 is attenuated by absorption of the sound energy by particles 210 as the sound energy passes through them, causing them to vibrate as shown by the bands around the particles 210.

The matrix may be gypsum, cement, concrete, polymer, ceramic, or another material in which the particle filler can be embedded. Foamed versions of these materials may also incorporate the filler. Foaming may be achieved through known methods such as air- or gas-entrainment, blowing agents, polyurethane reactions, or vacuum application. The matrix material may also include additional structural components such as reinforcing fillers, and may be incorporated in a composite structure itself, such as a laminated panel. These materials have excellent sound absorbing properties at low weight. Reinforcing fillers may be those known to be of use in the matrix material in various circumstances, such as polypropylene fibers, gravel, sand, carbon nanotubes, etc. For example, commercial gypsum wallboard often includes starch additives, paper fibers, glass fibers, etc. Gypsum wallboard in which particle filler is included for sound attenuation purposes may also retain these other fillers.

The dense core may be metal, mineral, or ceramic. The core is preferably steel or tungsten but may be any material that is denser than the surrounding matrix. The elastic coating may be polyurethane, silicone, rubber, or any other elastomeric polymer. The elastic coating is itself preferably filled with low density filler, such as polymer or glass micro-balloons, in order to control its mechanical properties and, importantly, its density and the total density of the particles. By way of example, low-density filler in the elastic matrix may make the particles softer, which may be advantageous in some applications.

The particles may have a core size of 10 nm to 100 cm, in some embodiments 1 mm to 5 cm, core density of 2.0 to 20 g/cc, coating thickness of 10 nm to 20 mm, in some embodiments 0.1 mm to 10 mm, coating elastic modulus of 0.005-0.5 GPa, in some embodiments 0.01 to 0.1 GPa, and coating density of 0.01 to 2.0 g/cc, in some embodiments 0.05 to 0.3 g/cc. Larger particles may be used in large composite structures, such as concrete slabs and walls used for highway sound isolation, to achieve very low frequency sound attenuation. In concrete slabs, large particles of about 5 cm or up to 20 cm may be used.

The acoustic band gap frequency of the composite material depends on the size and density of the core as well as the elastic modulus of the elastic coating of the filler particles. The attenuation frequency range generally increases with decreasing particle core size and broadens with particle core size distribution. Each particle size has a different frequency response, and the amount of attenuation achieved at a given frequency is primarily a factor of the concentration of the particles with the appropriate frequency response. Therefore, fewer particles at a given size and more particles at nearby sizes will reduce the attenuation at the frequency corresponding to the given size, but increase attenuation at the frequencies correlating to the nearby sizes, effectively reducing magnitude of attenuation while broadening the attenuation effect across the frequency spectrum. In this way, the sound attenuating properties of the composite can be controlled. Multiple particle sizes can be combined to cover larger frequency spans, resulting in broadband sound isolation in the audible range, similar to examples 8 and 11 detailed below. Alternatively, select frequencies can be isolated for designer sound attenuating properties. By selecting low frequencies for attenuation, vibration isolation may be achieved, for example in roadways and other structures such as bridge or building foundations. Vibration isolation may improve material durability. Total filler particle concentrations must be kept at levels that ensure adequate mechanical strength of the overall material for the given application. In some instances, excessively high filler particle concentrations result in unacceptable material weakness. The described sound-attenuating materials may also exhibit superior crack propagation performance, as cracks in the matrix material may be halted at the intersection of the matrix material with a filler particle.

The particles may be created by a variety of coating methods that result in a layered structure with an inner core and outer coating. The coating is preferably well distributed over the particles. In some embodiments, there may be multiple cores per particle. Such multiple-core particles may result from manufacturing a block of cores in matrix material and then shredding the block to obtain the individual particles. Preferred coating methods include pan-coating and/or fluidized bed coating. Particles are rolled in a drum and/or fluidized in a bed and the coating material precursor solution is applied, often while being dried and/or cured with hot air and/or moisture. Other types of mixers may also be used to produce the particles. Coating thickness and uniformity are important for very precise control of particle density; however, acceptable sound attenuation may often be achieved without such precise density or shape control. Therefore, the use of manufacturing methods that produce highly spherical particles may depend on the cost versus the density control needed for a given application.

By controlling the coating thickness, and using a coating and core density that span that of the matrix precursor, the density of the particles can be tuned to match the surrounding matrix. This is important to achieve ideal particle distribution throughout the matrix and to prevent separation due to differences in the matrix precursor density and the particle density. An even distribution of the coating on the particles leads to uniform density to avoid settling or floating of particles with different densities. In the case of multiple particle sizes in the same material, the densities of each can be matched to the matrix to ensure homogeneous dispersion in the surrounding matrix.

Example 1: Preparation of Coated ¼" Diameter Steel Cores

Particles consisting of ¼" diameter steel ball cores encapsulated in an elastic coating were prepared in a lab scale pan coater. A polymer solution was prepared by dispersing 226 g polydimethylsiloxane (100% Silicone Sealant from DAP) and 6.8 g acrylic microspheres (920 DE80 d30 from Akzo Nobel) in 912 g mineral spirits (Odorless Mineral Spirits from Klean Strip). The pan coater was charged with 500 g of steel cores (Low Carbon Steel Balls from McMaster Carr). The density of the starting substrate was 7.7 g/cm³. Hot air at 80° C. was blown onto the particle bed during the coating process. The polymer mixture (25° C.) was sprayed onto the steel cores at a rate of 7 mL/min with an air atomized spray gun (WA740 HVLP Plus from Walther Pilot). The coating process was carried out over a period of 8 hrs. The discharged particles exhibited high uniformity and maintained the same degree of sphericity and roundness as the starting core material (>0.9 Krumbein-Sloss shape factors). The resulting particles had a diameter of 10.8+/−0.2 mm, coating thickness of 2.2 mm, and density of 1.9 g/cm³.

Example 2: Preparation of Coated ⅛" Diameter Steel Cores

Particles consisting of ⅛" diameter steel ball cores encapsulated in an elastic coating were prepared in accordance with the aforementioned procedure. Through the layered coating approach, the density of the particles was reduced from 7.7 g/cm³ (uncoated) to 2.0 g/cm³ (coated). The resulting particles had a diameter of 5.4+/−0.3 mm and a coating thickness of 1.1 mm.

Example 3: Preparation of Coated 1/16" Diameter Steel Cores

Particles consisting of 1/16" diameter steel ball cores encapsulated in an elastic coating were prepared in accordance with the aforementioned procedure. Through the layered coating approach, the density of the particles was reduced from 7.7 g/cm³ (uncoated) to 2.2 g/cm³ (coated). The resulting particles had a diameter of 2.6+/−0.3 mm and a coating thickness of 0.5 mm.

Example 4: Preparation of Coated 0.8 mm Diameter Tungsten Cores

Particles consisting of 0.8+/−0.1 mm diameter tungsten carbide pellets encapsulated in an elastic coating were prepared in a pan coater. A polymer solution was prepared by dispersing 383 g polydimethylsiloxane (100% Silicone Sealant from DAP) and 11.5 g acrylic microspheres (920 DE80 d30 from Akzo Nobel) in 1160 g mineral spirits (Odorless Mineral Spirits from Klean Strip). The pan coater was charged with 500 g of tungsten pellets (20/40 Tungsten Carbide pellets from TungCo). 20/40 pellets have 90% of their particles between 20 and 40 mesh (U.S. Standard Sieve Series) as described in ASTM E-11. Hot air at 80° C. was blown onto the particle bed during the coating process. The polymer mixture (25° C.) was sprayed onto the tungsten cores at a rate of 14 mL/min with an air atomized spray gun. The coating process was carried out over a period of 8 hrs. The discharged particles were uniform in size and exhibited an equivalent degree of sphericity and roundness as the starting core material (>0.9 Krumbein-Sloss shape factors). The resulting particles had a diameter of 1.7+/−0.4 mm, coating thickness of 0.45 mm, and density of 2.1 g/cm³.

Figure 3:
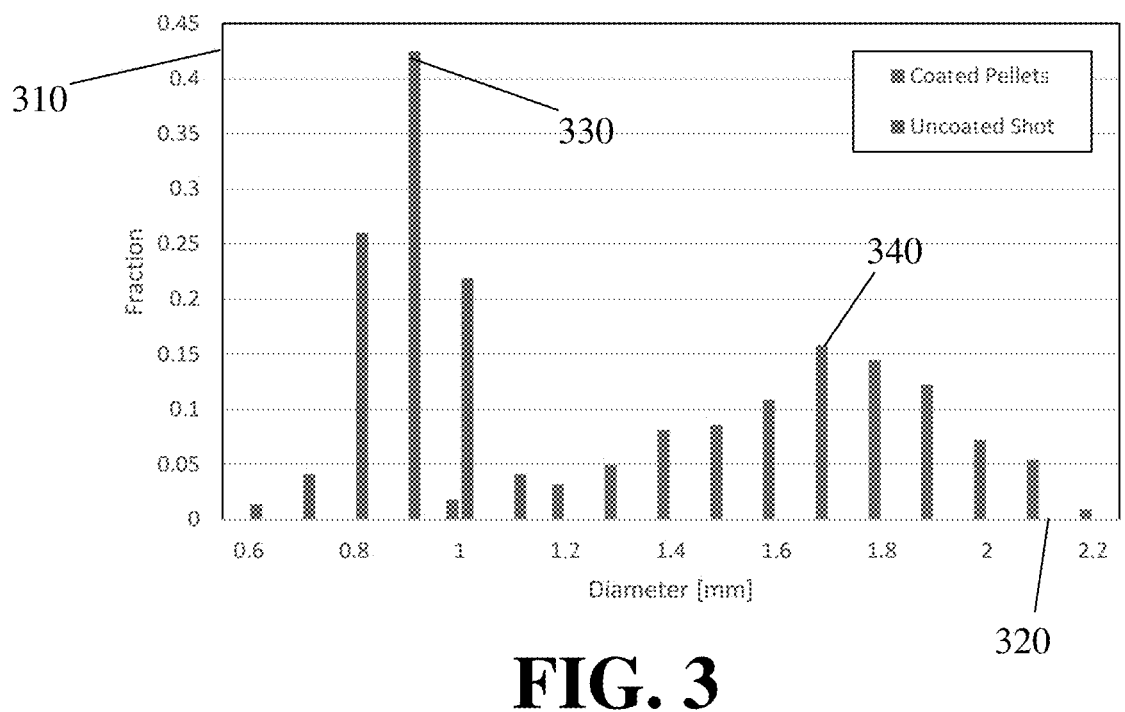
FIG. 3 is a size distribution comparison of uncoated and coated tungsten particles.

The size distribution (fraction 310 at each diameter 320) of the uncoated tungsten and coated particles are graphically illustrated in FIG. 3. The uncoated tungsten is smaller in size and has a tighter distribution, with a peak fraction of between 0.4 and 0.45 at a diameter of 0.9 mm and all falling between 0.6 mm and 1.1 mm, compared to a peak fraction of the coated particles of just over 0.15 at 1.7 mm diameter and a size range of 1 mm to 2.2 mm.

The results of the tests from Examples 1-4 are also set forth in Table 1.

TABLE 1

Particle characterization results comparing different substrate sizes and materials

| Core Material | Core Diameter mm | Std. Dev. Of Mean mm | Core Density g/cc | Coated Particle Diameter mm | Std. Dev. Of Mean mm | Particle Density g/cc | Coating Thickness mm |
|---|---|---|---|---|---|---|---|
| Steel Balls | 6.4 | +/−0.1 | 7.7 | 10.8 | +/−0.2 | 1.9 | 2.2 |
| Steel Balls | 3.2 | +/−0.1 | 7.7 | 5.4 | +/−0.3 | 2 | 1.1 |
| Steel Balls | 1.6 | +/−0.1 | 7.7 | 2.6 | +/−0.3 | 2.2 | 0.5 |
| Tungsten Carbide Pellets | 0.8 | +/−0.1 | 15.6 | 1.7 | +/−0.4 | 2.1 | 0.45 |

Example 5: Preparation of Plaster Board with Particles from Example 1

To 1 part water was added, by sifting, 2 parts plaster, which were allowed to soak for 1 min. The slurry was mixed in a Fann blender for 60 sec at 4000 rpm. Separately, 0.1 g of foaming agent ("MasterCell 30" from BASF) and 4 g of water were mixed at 4000 rpm for 60 sec to generate a stable foam. The foam was added to the unfoamed plaster slurry and blended for an additional 60 sec at 4000 rpm. To the thus-prepared slurry was added 20 wt % particles as prepared in Example 1, which were mixed in by hand. The resulting mixture was poured into a 6"×6"×½" oiled glass mold faced with heavy paper stock and allowed to set for 12 hrs. The sample board was then removed from the mold and dried in a convection oven at 70° C. for 24 hrs. A measure of the acoustic attenuation was conducted using a pair of 24 kHz transducers in a pitch-catch configuration using a frequency sweep. In such a known configuration, one transducer transmits a frequency against the surface of the sample board, while the other transducer, some distance away on the same side of the sample board, receives the frequency as it is reflected back after propagating along the board surface. Propagation along the board surface is highly correlated to propagation through the board.

Figure 4:
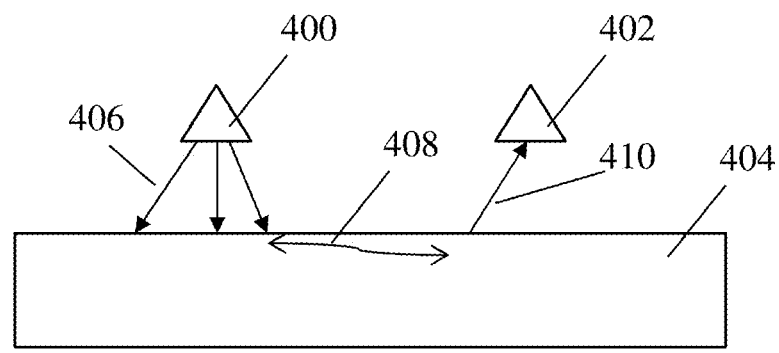
FIG. 4 illustrates an acoustic attenuation test conducted on a panel similar to or the same as that shown in FIG. 2A.

FIG. 4 illustrates such a configuration, with emitting transducer 400, receiving transducer 402, composite board 404, original signal 406, signal propagating through the surface of the board 408, and finally the signal received at the second transmitter 410. A neat plaster board was prepared in the same manner as above to serve as a control; it did not contain any coated particles. The thus-prepared composite plaster board exhibited 65 dB increased attenuation over the control at a center frequency of 3,500 Hz with 3,500 Hz bandwidth (1,750 Hz to 5,250 Hz). The bandwidth is the range over which attenuation is at least 10% of the peak attenuation (65 dB). Thus, at least 6.5 dB of attenuation was demonstrated between the range from 1,750 to Hz.

Example 6: Preparation of Plaster Board with Particles from Example 2

To 1 part water was added, by sifting, 2 parts plaster, which was allowed to soak for 1 min. The slurry was mixed in a blender for 60 sec at 4000 rpm. Separately, 0.1 g of foaming agent ("MasterCell 30" from BASF) and 4 g of water were mixed at 4000 rpm for 60 sec to generate a stable foam. The foam was added to the unfoamed plaster slurry and blended for an additional 60 sec at 4000 rpm. To the thus-prepared slurry was added 20 wt % particles from Example 2, which were mixed in by hand. The resulting mixture was poured into a 6"×6"×½" oiled glass mold faced with heavy paper stock and allowed to set for 12 hrs. The sample board was then removed from the mold and dried in a convection oven at 70° C. for 24 hrs. A measure of the acoustic attenuation was conducted using a pair of 24 kHz transducers in a pitch-catch configuration using a frequency sweep. A neat plaster board was prepared in the same manner as above to serve as a control; it did not contain any coated particles. The thus-prepared composite plaster board exhibited 65 dB increased attenuation at a center frequency of 8,500 Hz with 8,000 Hz bandwidth.

Example 7: Preparation of Plaster Board with Particles from Example 3

To 1 part water was added, by sifting, 2 parts plaster, which was allowed to soak for 1 min. The slurry was mixed in a blender for 60 sec at 4000 rpm. Separately, 0.1 g of foaming agent ("MasterCell 30" from BASF) and 4 g of water were mixed at 4000 rpm for 60 sec to generate a stable foam. The foam was added to the unfoamed plaster slurry and blended for an additional 60 sec at 4000 rpm. To the thus-prepared slurry was added 20 wt % particles from Example 3, which were mixed in by hand. The resulting mixture was poured into a 6"×6"×½" oiled glass mold faced with heavy paper stock and allowed to set for 12 hrs. The sample board was then removed from the mold and dried in a convection oven at 70° C. for 24 hrs. A measure of the acoustic attenuation was conducted using a pair of 24 kHz transducers in a pitch-catch configuration using a frequency sweep. A neat plaster board was prepared in the same manner as above to serve as a control; it did not contain any coated particles. The thus-prepared composite plaster board exhibited 60 dB increased attenuation at a center frequency of 14,000 Hz with 15,000 Hz bandwidth.

Example 8: Preparation of Plaster Board with Particles from Examples 1, 2, and 3

To 1 part water was added, by sifting, 2 parts plaster, which was allowed to soak for 1 min. The slurry was mixed in a blender for 60 sec at 4000 rpm. Separately, 0.1 g of foaming agent ("MasterCell 30" from BASF) and 4 g of water were mixed at 4000 rpm for 60 sec to generate a stable foam. The foam was added to the unfoamed plaster slurry and blended for an additional 60 sec at 4000 rpm. To the thus-prepared slurry was added 7 wt % particles from Example 1, 7 wt % particles from Example 2, and 7 wt % particles from Example 3, which were mixed in by hand. The resulting mixture was poured into a 6"×6"×½" oiled glass mold and allowed to set for 12 hrs. The sample board was then removed from the mold and dried in a convection oven at 70° C. for 24 hrs. A measure of the acoustic attenuation was conducted using a pair of 24 kHz transducers in a pitch-catch configuration using a frequency sweep. A neat plaster board was prepared in the same manner as above to serve as a control; it did not contain any coated particles. The thus-prepared composite plaster board exhibited 50 dB increased attenuation at a center frequency of 10,000 Hz with 20,000 Hz bandwidth.

Example 9: Preparation of Foam Cement Board with Particles from Example 4

Unfoamed cement slurry was mixed at a water:cement ratio of 0.44 in a Fann blender in accordance to API Specification 10A by mixing 141 g water with 354 g of API Portland Class H hydraulic cement. Separately, 0.1 g of foaming agent ("MasterCell 30" from BASF) and 4 g of water were mixed at 4000 rpm for 60 s to generate a stable foam. The foam was added to the unfoamed cement slurry and blended for an additional 60 s at 4000 rpm. To the thus-prepared foamed slurry was incorporated 25 wt % particles from Example 4 with a mixing blade attached to a handheld drill until a uniform distribution of particles was achieved. The resulting mixture was poured into a 6"×6"×½" oiled glass mold faced with heavy paper stock and allowed to set for 12 hrs. A measure of the acoustic attenuation was conducted using a pair of 24 kHz transducers in a pitch-catch configuration using a frequency sweep. A neat plaster board was prepared in the same manner as above to serve as a control; it did not contain any coated particles. The thus-prepared composite plaster board exhibited 55 dB increased attenuation at a center frequency of 14,000 Hz with 16,000 Hz bandwidth.

Example 10: Preparation of a Composite Sandwich Plaster Board

A composite sandwich panel was prepared by joining two plaster panels with an elastic layer. To 1 part water was added, by sifting, 2 parts plaster, which was allowed to soak for 1 min. The slurry was mixed in a blender for 60 sec at 4000 rpm. Separately, 0.2 g of foaming agent ("MasterCell 30" from BASF) and 8 g of water were mixed at 4000 rpm for 60 sec to generate a stable foam. The foam was added to the unfoamed plaster slurry and blended for an additional 60 sec at 4000 rpm. The resulting mixture was poured into two 6"×6"×½" oiled glass mold faced with heavy paper stock and allowed to set for 12 hrs. The sample boards were then removed from the mold and dried in a convection oven at 70° C. for 24 hrs. To 200 g of polydimethylsiloxane (PDMS) was added 75 g of 20/40 tungsten carbide pellets. The polymer was mixed by hand until a homogenous mixture was achieved. In the bottom of a 6"×6"×⅝" mold was placed a prepared plaster board. To the top of the plaster board was added a ⅛" thick layer of the polymer tungsten mixture. A prepared plaster board was placed on top of the polymer layer. The assembly was lightly clamped to allow squeeze-out of the excess polymer and to ensure even spacing between the plaster panels. Two neat plaster boards were prepared in the same manner as above and adhered together with epoxy to serve as a control. The thus-prepared composite plaster board exhibited 50 dB increased attenuation at a center frequency of 10,000 Hz with 20,000 Hz bandwidth.

Example 11: Preparation of Expanding Polyurethane Foam Board with Particles from Examples 1, 2, and 3

In another embodiment, particles from Examples 1, 2, and 3 were incorporated into polyurethane expanding insulation foam (GREAT STUFF from Dow Chemical Company) to create an acoustic insulation filler. Two hundred grams of GREAT STUFF foam was discharged from the aerosol canister into a beaker. To the foam was added 10 wt % particles from Example 1, 10 wt % particles from Example 2, and 10 wt % particles from Example 3, which were mixed in by hand until a uniform distribution of particles was observed. The foam composite was placed in a 6"×6"×1" oiled glass mold and allowed to set for 12 hrs. A control foam sample was also produced that contained no particles. A measure of the acoustic attenuation was conducted using a pair of 24 kHz transducers in a pitch-catch configuration using a frequency sweep. The thus-prepared composite foam insulation exhibited 30 dB increased transmission loss at a center frequency of 10,000 Hz with a bandwidth of 20,000 kHz.

Example 12: Preparation of Cement Slabs with Particles from Example 1

In yet another embodiment, a large composite cement slab was prepared with particles from Example 1. To a 5 cu. ft. rotary drum cement mixer was added 17 kg of water and 40 kg of Portland cement (Type I-II from Hawaiian Cement). The slurry was mixed for 5 min. To the thus-prepared slurry was added 25 wt % particles from Example 1, and the slurry was mixed for an additional 5 min. The composite slurry was poured into a 20"×20"×4" mold and allowed to set for 24 hrs. A measure of the acoustic attenuation was conducted using a pair of 24 kHz transducers in a pitch-catch configuration using a frequency sweep. The thus-prepared composite cement slab exhibited 50 dB transmission loss at a center frequency of 2,000 Hz with a bandwidth of 4,000 Hz compared to a cement slab with no particles.

Example 13: Testing of Enhanced Construction Materials

Impedance tube and ultrasonic acoustic testing of soundproof wallboard according to embodiments of the present invention were conducted to demonstrate its enhanced resistance to both airborne and structure borne acoustic transmission.

Figure 5:
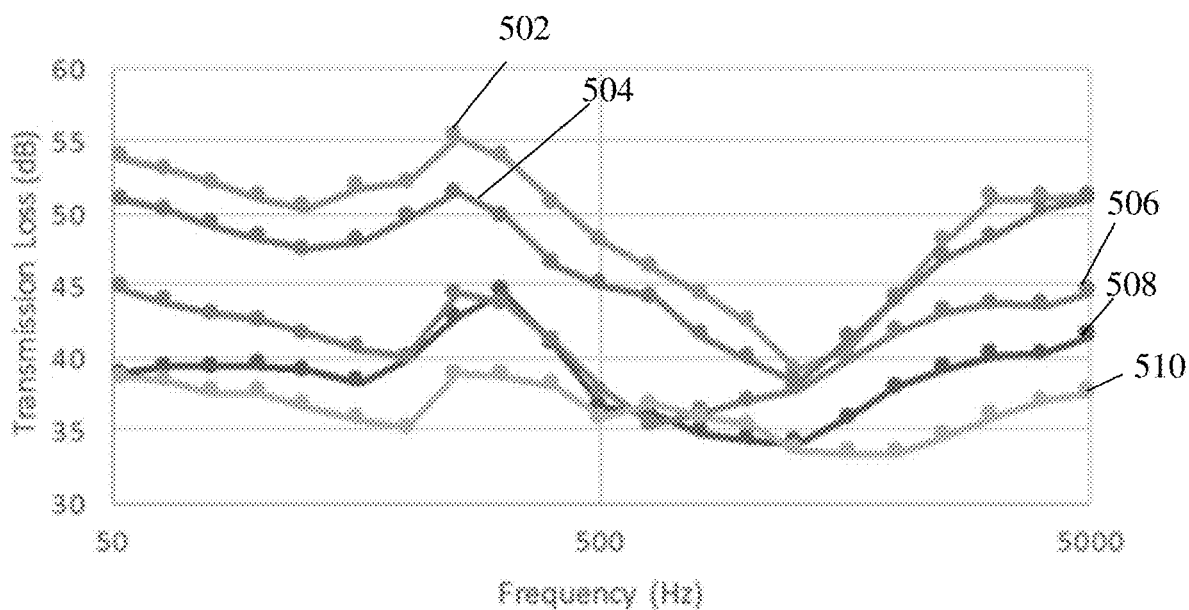
FIG. 5 shows impedance tube testing results for a wallboard according to an embodiment of the present invention, as well as controls.
Figure 6:
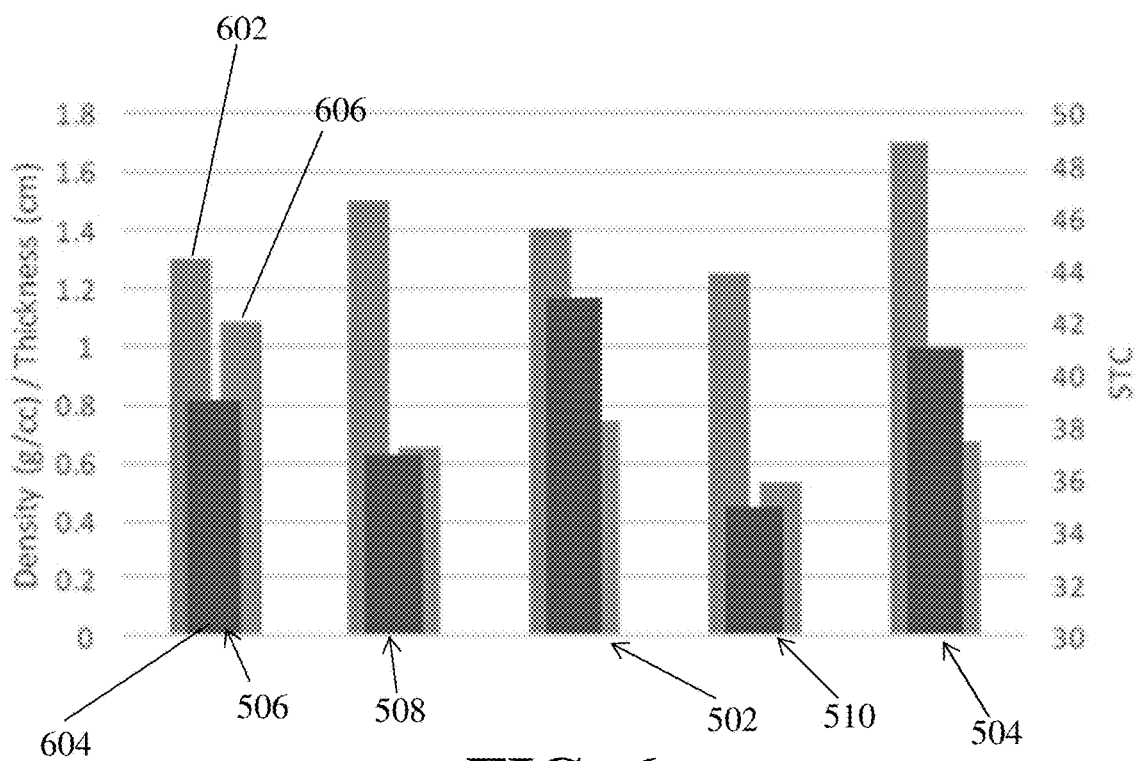
FIG. 6 shows STC values from impedance tube, thickness, and density for the same samples as FIG. 5.

Cored (1¼" diameter) papered gypsum wallboard samples—both an embodiment of the present invention and commercial versions, were tested according to a modified version of ASTM E2611-09, Standard Test Method for Measurement of Normal Incidence Sound Transmission of Acoustical Materials Based on the Transfer Matrix Method, using a transmission loss and impedance tube. This method measures transmission loss as a function of frequency for airborne sound. Lightweight (light) and heavier (neat) gypsum samples (beta calcium sulfate hemihydrate, water, surfactant foam, and no other additives) were tested along with the enhanced samples containing the additive according to an embodiment of the present invention (same nominal density as light). Commercial sound-reducing construction materials A and B were also tested as controls. The transmission loss results are shown in FIG. 5, while the calculated STC (Sound Transmission Class) values and corresponding sample thickness and density measurements are shown in FIG. 6, each showing results for the light 508, neat 506, enhanced 502, material A 510 and material B 504 samples. In FIG. 6, the left bar 602 is thickness in cm, the center bar 604 is the STC, and the right bar 606 is the density in g/cc. It can be seen that the enhanced sample according to an embodiment of the present invention substantially outperforms the other samples in STC.

Figure 7:
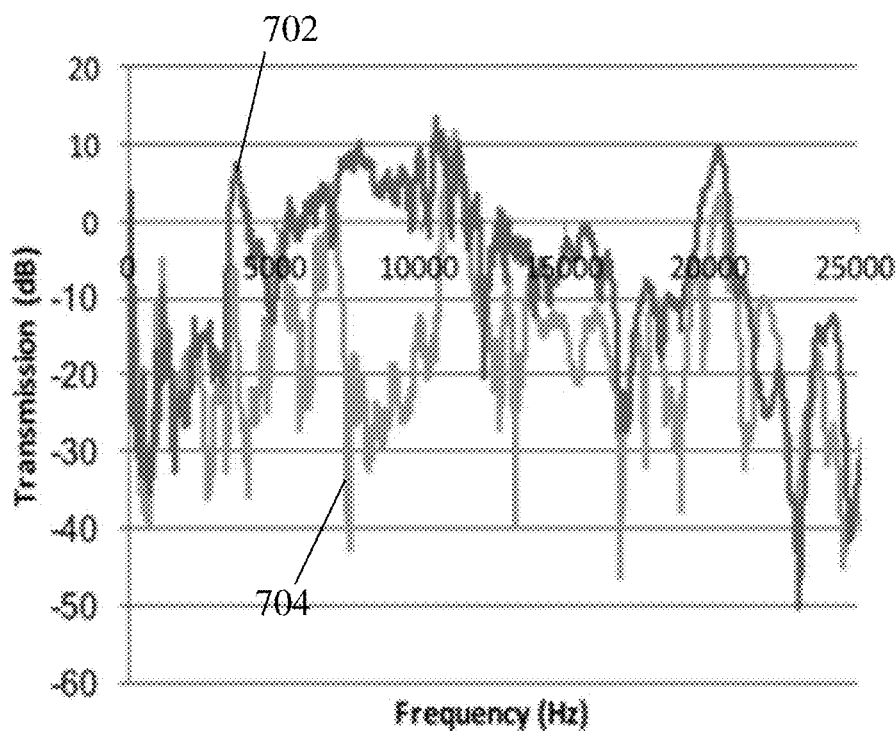
FIG. 7 shows ultrasonic testing results for commercial wallboard samples.
Figure 8:
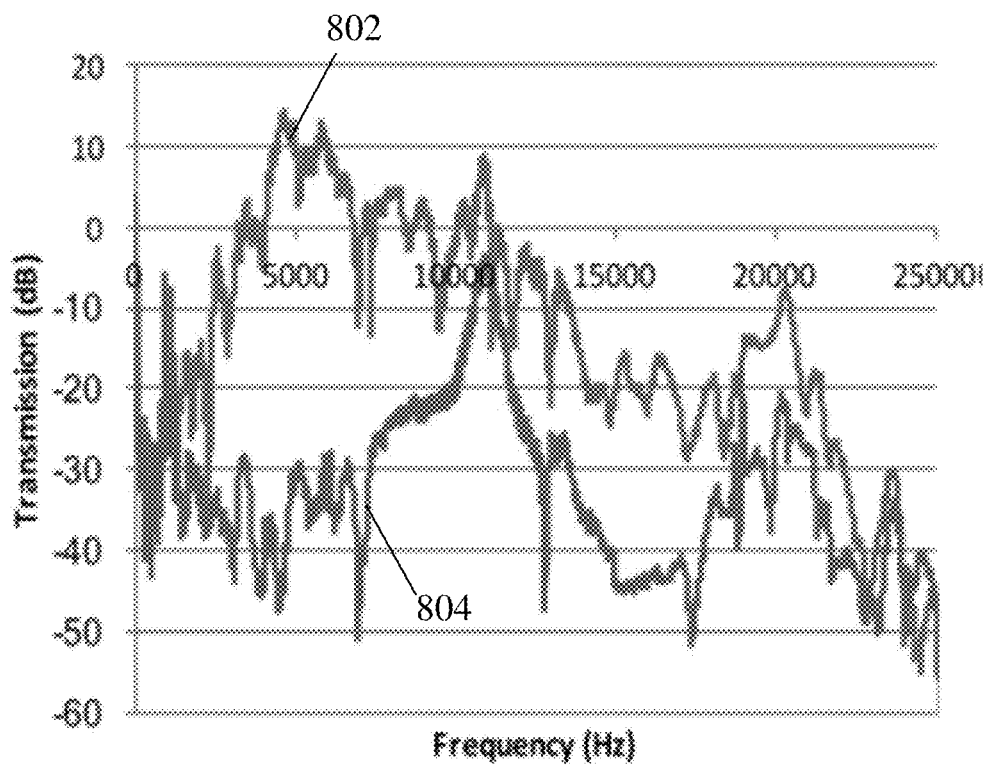
FIG. 8 shows ultrasonic testing results for a wallboard sample according to an embodiment of the present invention, as well as a control.

Papered wallboard samples (6"×6"×½") were tested using an ultrasonic transducer setup with source and receiver transducers, amplifiers, signal generator, and data acquisition card. Measurements were made in an indirect mode with source and receiver on the same side of the sample. This test indicates resistance to structure-borne acoustic transmission as a function of frequency. Results for commercial boards A 704 and C 702 are shown in FIG. 7, while the results for control 802 and enhanced (embodiment of the present invention) 804 boards are shown in FIG. 8. Control and enhanced boards 802, 804 have the same density as commercial board A 704. Again, the enhanced sample 804 substantially outperforms the others.

Example 14: Preparation of Coated Stainless Steel Cores Using Fluidized Bed Coater Stainless steel (SS) shot particles were encapsulated with an elastic coating using a fluidized bed coater. Specifically, the SS shot particles were primed and air-dried with volatile siloxane to improve the quality and speed of adhesion with a polymer solution. This polymer solution was prepared by dispersing polydimethylsiloxane (100% Silicone Sealant) and acrylic microspheres (thermoplastic microsphere encapsulating a gas) in mineral spirits (Odorless Mineral Spirits). The fluidized bed coater was then charged and fluidized with the siloxane primed SS shot particles. During the coating process, the fluidized bed coater was kept at a temperature of 80° C. The polymer solution (at 25° C.) was sprayed onto the primed SS shot particles with an air atomized spray gun. The resultant coated particles were uniform in size and exhibited an equivalent degree of sphericity and roundness to the starting core material (>0.9 Krumbein-Sloss shape factors).

The SS shot particles for this example can have a diameter ranging from 0.149 to 1.680 mm. 10 to 10,000 mL of volatile siloxane can be used to prime the SS short particles before coating. For the polymer solution, between 0.85 and 170 kg polydimethylsiloxane and between 0.034 to 6.8 kg acrylic microspheres can be combined in 2.55 to 510 kg mineral spirits. The polymer solution may have 0.5-2% acrylic microspheres and a specific ratio of microspheres/silicone/mineral spirits of between 1/50/150 to 1/12/38. The fluidized bed coater can be charged and fluidized with 5-1000 kg of the siloxane primed SS shot particles. Spraying of the solution onto the primed SS short particles can be achieved at a rate of 10-20 mL/min with the air atomized spray gun. The entire coating process may be carried out over a period of 8-24 hrs. Resulting particles have a diameter of 0.25-4.76 mm, a coating thickness of 0.1-3.0 mm, and a density of 2-3 g/cm$^3$.

Example 15: Preparation and Testing of Sound Attenuating Cement and Concrete

Samples of sound attenuating cement and concrete were generated. Typical samples had a size of 8"×8"×2" and a density of 16 lbs per gallon. For the cement samples, as a base material, Portland cement (from Quikrete) that had an appropriate water-to-cement ratio to achieve the targeted density (e.g., 16 lbs per gallon) was used. For the concrete samples, sand and gravel were incorporated into the cement base material, thereby resembling the concrete used in flooring. The concrete for this example had a ratio of 1:2:2 parts by volume of cement:gravel:sand, as well as an admixture (a liquid superplasticizer from Iksung), resulting in a ratio of approximately 1:2:2:0.1 parts by volume of cement:gravel:sand:plasticizer.

Each of two different types of sound attenuating particles were then mixed into both the cement and concrete, generating two cement samples and two concrete samples. Specifically, the two types of sound attenuating particles tested were: (1) stainless steel (SS) shot particles encapsulated with a first polymer coating, and (2) tungsten carbide (WC) particles encapsulated with a second polymer coating. The respective coating for both types of particles was applied via spraying in a fluidized bed coater.

The first set of sound attenuation particles were generated by taking 6 kg of SS shot particles (16/35 stainless steel) and applying the first polymer coating, which has a formulation of 1254.0 g mineral spirits, 416 g silicone (737 silicone from Dow), and 11.4 g microballoons (Expancel 920 DE 80 d30 microballoons). The second set of sound attenuation particles were generated by taking 5.22 kg of tungsten carbide particles (14/24 tungsten carbide) and applying the second polymer coating, which has a formulation of 1386.0 g mineral spirits, 460 g silicone (737 silicone from Dow), and 12.6 g microballoons (Expancel 920 DE 80 d30 microballoons). Both sets of polymer solutions were generated by adding the mineral spirits to the silicone and stirring at 400-500 rpm for 30 min. The microballoons were then added to the solution and further stirred at 450 rpm for 20 min. The resultant polymer solution was filtered through a paint mesh filter, which removes unmixed chunks of the polymer solution, thereby resulting in the polymer solution being sufficiently homogenous to prevent clocking of the spray nozzle and to provide sufficient coating.

Each of the two sets of sound attenuation particles were added into the cement and the concrete at approximately 8.6 wt % of the total dry mixture, resulting in homogeneous slurries with good handling properties (e.g., easy to pour and well distributed) and final cured materials with evenly distributed particles (e.g., the particles are evenly distributed and/or separated throughout the slurry and the final cement and/or concrete block, with minimal to no agglomeration of particles).

For testing, a testing box was constructed to acoustically isolate a sound meter for the impact sound transmission testing of concrete and cement samples. The box was insulated with acoustic foam and a space was made on the side for sound meter insertion and a hole was created at the top for placing samples. A ball drop fixture was built for dropping steel and rubber coated steel balls from a consistent height and placed above the sample and box. Direct and indirect impact noises were used, either by directly dropping the ball on the surface/impacting the surface with a rubber hammer, or by utilizing a wooden "bridge" which allowed the impact sound to be generated just above the surface. A Larson-Davis sound meter was used to collect impact sound transmission data. A rubber hammer was also used to create direct and indirect impact sounds. In addition to the ball drop and hammer-based impacts, a tapping machine (Cesva MI005) with electronically controlled impacts was used to ensure that repeatable impact noises were being generated.

The tapping machine was situated above tested samples with a space below for the sound meter. The middle three hammers of the tapping machine were used to generate impact sounds. Acoustic noise samples were recorded for ten seconds and processed for spectral analysis.

Figure 9:
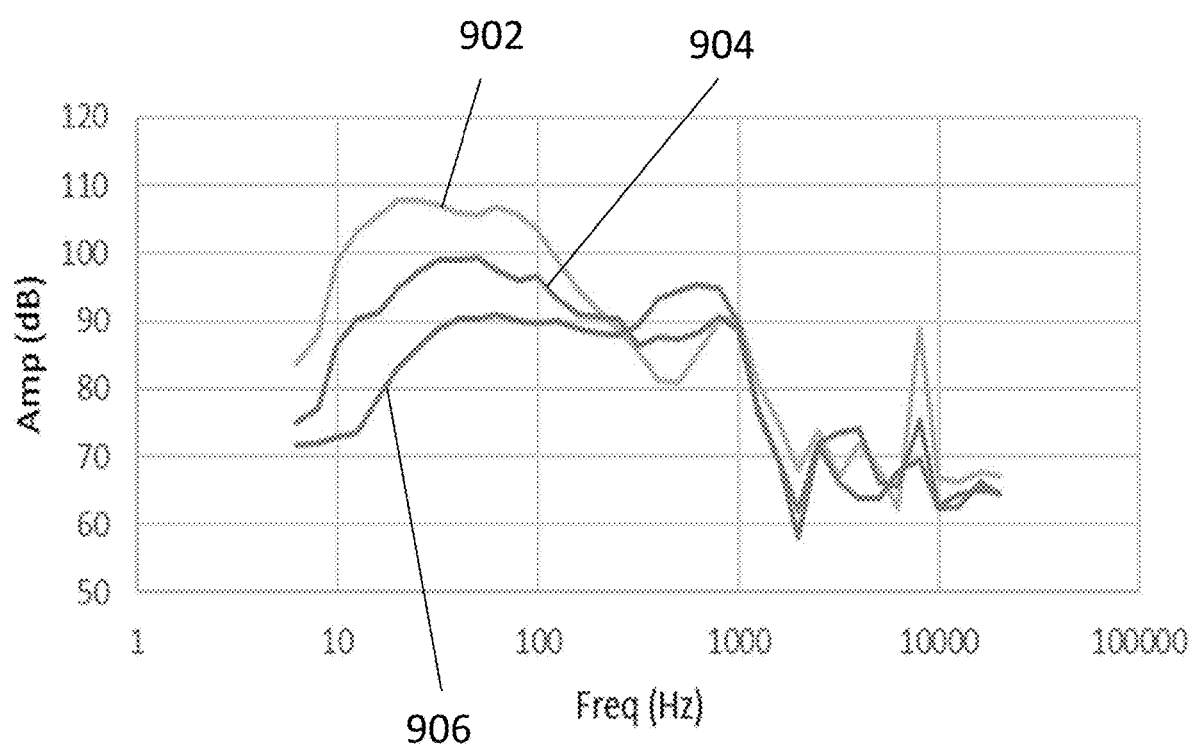
FIG. 9 shows impact sound testing for two cement samples according to embodiments of the present invention, as well as a control.

Results from direct impact hammer testing of the cement samples at high amplitude indicate a decrease in sound transmission at low frequencies. The two different sound attenuation particle types tested had different levels of sound attenuation in the cement samples, as shown in FIG. 9. Trace 902 shows the behavior of a control sample, while trace 904 shows the first set of sound attenuation materials (i.e., the SS-based particles) and trace 906 shows the second set of attenuation materials (i.e., the WC-based particles). As can be seen, both of the particle types showed lowered acoustic transmission most consistently at frequencies ranging from 8-300 Hz. At these frequencies, the cement samples with the WC-based particles (trace 906) performed the best at reducing sound impacts.

Figure 10:
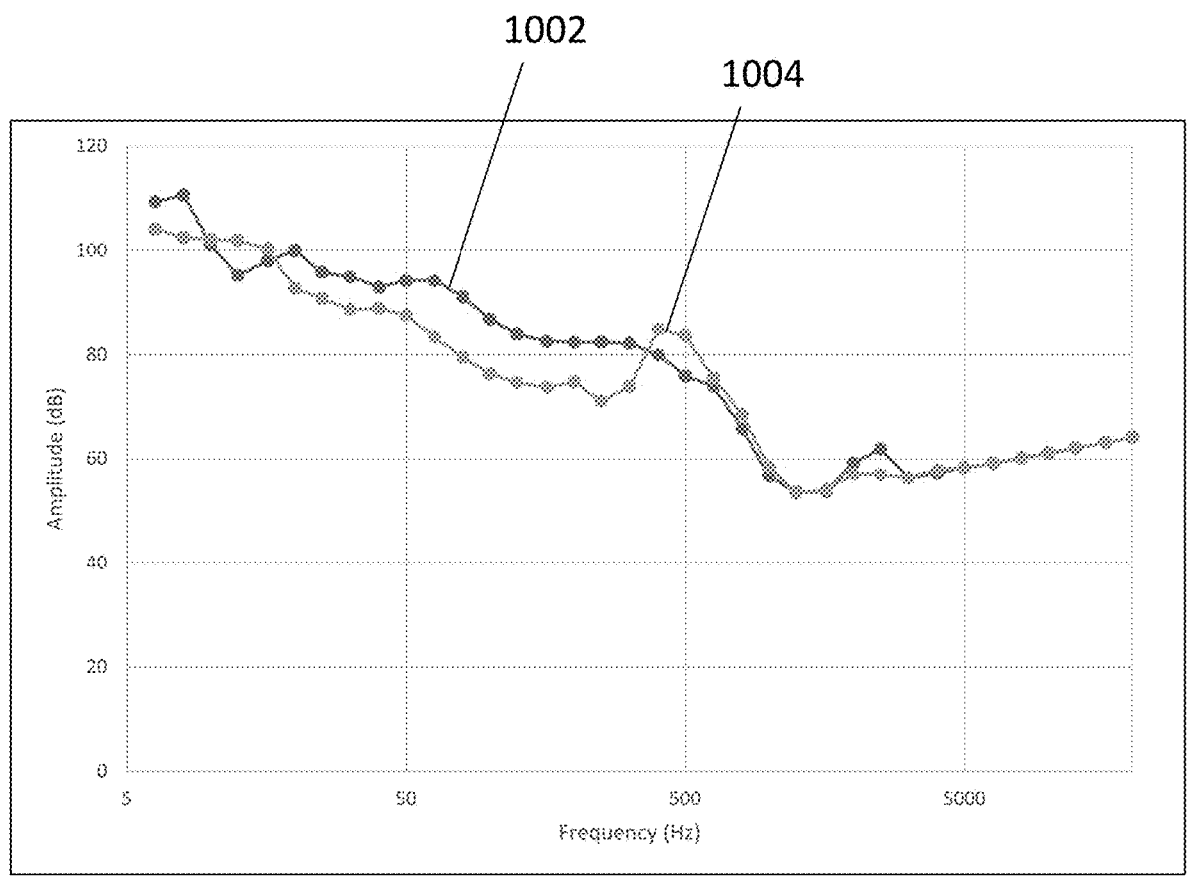
FIG. 10 shows impact sound testing for a concrete sample according to an embodiment of the present invention, as well as a control.

Testing of the concrete samples from direct impact testing using the ball drop and hammer as impact sources displayed a similar behavior to the cement samples. FIG. 10 shows the behavior of a control sample (trace 1002) as compared to the concrete sample with the WC-based particles (trace 1004). As can be seen, the WC-based particles show reduced sound transmission over a large frequency range (e.g., a 5-12 dB decrease at frequencies up to 300 Hz).

Figure 11:
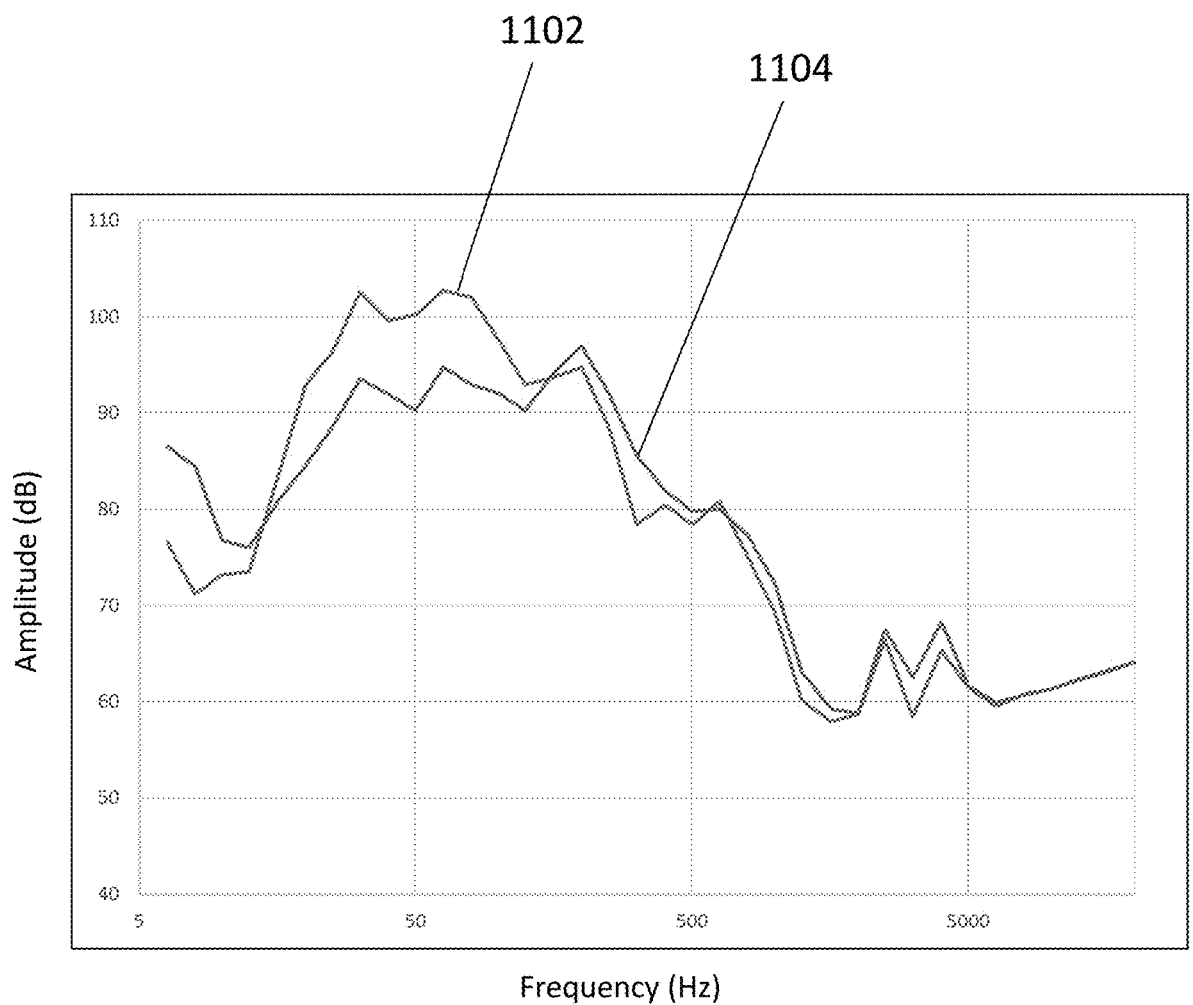
FIG. 11 shows sound transmission results from a tapping machine for a concrete sample according to an embodiment of the present invention, as well as a control.

Finally, testing was performed on the concrete samples using the tapping machine to create a highly repeatable impact sound. Results from this test are shown in FIG. 11, with a control sample (trace 1102) compared against the concrete sample with the WC-based particles (trace 1104). The WC-based particles showed up to a 10 dB reduction at frequencies ranging from 10 Hz to 160 Hz.

The results of the aforementioned testing show the acoustic band gap properties of the sound attenuation materials at low frequencies (e.g., 10 to 500 Hz), which decreases sound transmission substantially (e.g., by 5 to 30 dB) at these frequencies.

Figure 12:
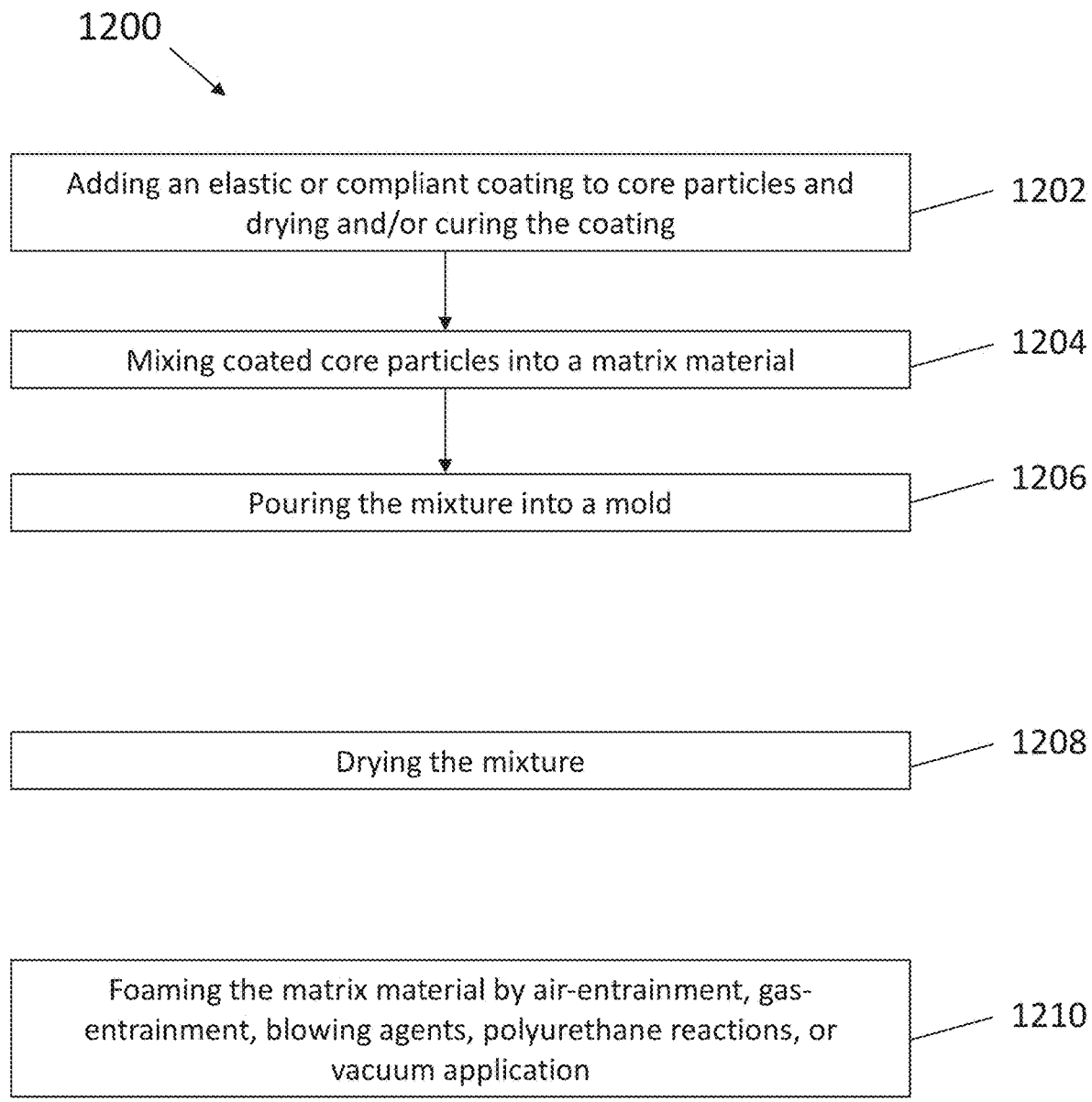
FIG. 12 shows a method of manufacturing sound attenuating materials, according to an embodiment of the present invention.

As described above herein, a method of manufacturing sound attenuating materials is disclosed, which is shown in FIG. 12. The method 1200 includes, at block 1202, adding an elastic or compliant coating to core particles and drying and/or curing the coating, at block 1204, mixing coated core particles into a matrix material, and, at block 1206, pouring the mixture into a mold. The method 1200 can further include, at block 1208, drying the mixture. The method 1200 can also include, at block 1210, foaming the matrix material by air-entrainment, gas-entrainment, blowing agents, polyurethane reactions, or vacuum application.

Figure 13:
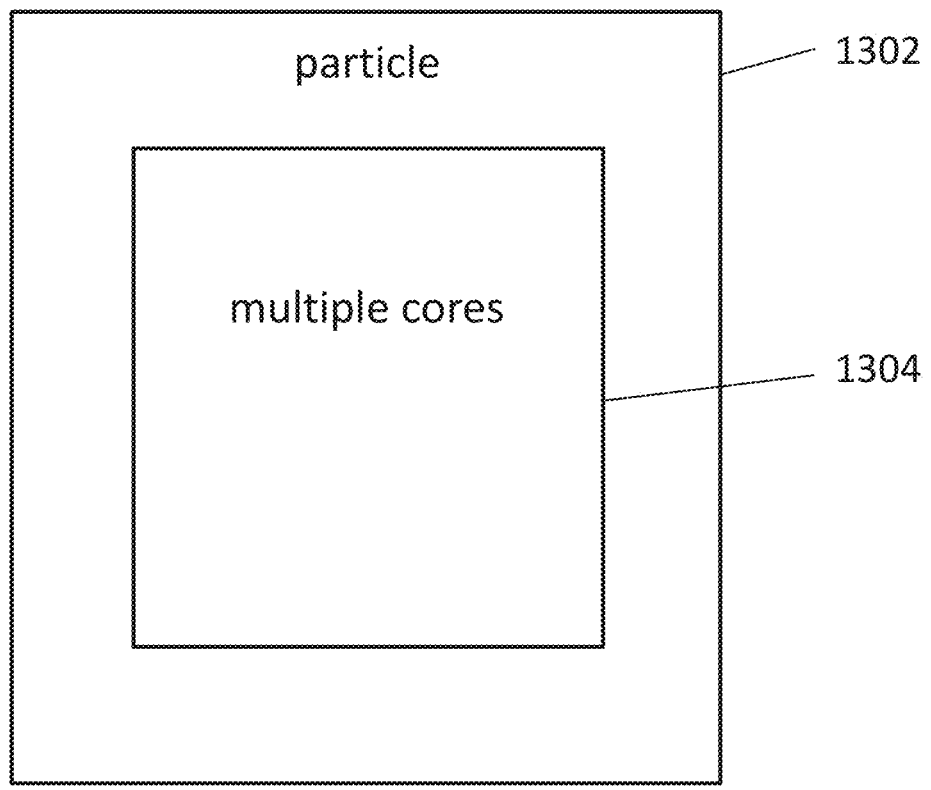
FIG. 13 is a schematic diagram showing a sound attenuating particle containing multiple cores, according to an embodiment of the present invention.

As further described above herein, there may be multiple cores in each of the sound attenuating particles, which is shown in the schematic diagram of FIG. 13. Sound attenuating particle 1302 contains multiple cores 1304.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A sound attenuation material, comprising:
    a plurality of particles, each comprising a core and an elastic or compliant coating around the core; and
    a matrix surrounding the plurality of particles;
    wherein the core is denser than the coating,
    wherein the coating is foamed, and
    wherein the plurality of particles is pan-coated, fluidized bed-coated, or both.

2. The sound attenuation material of claim 1, wherein the elastic or compliant coating comprises filler material having a density lower than that of the matrix.

3. The sound attenuation material of claim 2, wherein the filler material comprises polymer or glass micro-balloons.

4. The sound attenuation material of claim 1, wherein the particles are spherical.

5. The sound attenuation material of claim 1, wherein the plurality of particles comprises several different masses of particles.

6. The sound attenuation material of claim 1, wherein the matrix is a construction material.

7. The sound attenuation material of claim 1, wherein the matrix comprises gypsum, cement, concrete, polymer, or ceramic.

8. The sound attenuation material of claim 1, wherein the matrix comprises reinforcing fillers, the reinforcing fillers selected from the group consisting of: polypropylene fibers, gravel, sand, carbon nanotubes, starch additives, paper fibers, glass fibers, and combinations thereof.

9. The sound attenuation material of claim 1, wherein the core of one or more of the plurality of particles is metal, mineral, or ceramic.

10. The sound attenuation material of claim 9, wherein the core of the one or more of the plurality of particles is steel or tungsten.

11. The sound attenuation material of claim 1, wherein the elastic coating of one or more of the plurality of particles is an elastomeric polymer.

12. The sound attenuation material of claim 11, wherein the elastic coating of the one or more of the plurality of particles is polyurethane, silicone, or rubber.

13. The sound attenuation material of claim 1, wherein the core of one or more of the plurality of particles has a diameter of 10 nm to 100 cm and density of 2.0 to 20 g/cc, and the elastic coating of the one or more of the plurality of particles has a thickness of 10 nm to mm, an elastic modulus of 0.005 to 0.5 GPa, and a density of 0.01 to 2.0 g/cc.

14. The sound attenuation material of claim 13, wherein the core of the one or more of the plurality of particles has a diameter of 1 mm to 5 cm, and the elastic coating of the one or more of the plurality of particles has a thickness of 0.1 mm to 10 mm, an elastic modulus of 0.01 to 0.1 GPa, and a density of 0.05 to 0.3 g/cc.

15. The sound attenuation material of claim 1, wherein the plurality of particles is homogenously distributed in the matrix.

16. The sound attenuation material of claim 1, wherein one or more of the plurality of particles comprises more than one core.

17. A method of manufacturing sound attenuating materials, comprising:
    adding a foamed elastic or compliant coating to core particles and at least one of: drying the foamed coating, and curing the foamed coating, thereby generating coated core particles;

mixing the coated core particles into a matrix material, thereby generating a mixture; and pouring the mixture into a mold;

wherein the core particles are denser than the matrix material.

18. The method of claim 17, further comprising drying the mixture.

19. The method of claim 17, wherein the core particles have a range of masses.

20. The method of claim 19, wherein each mass of core particle corresponds to a resonant frequency, wherein the masses of the core particles are selected based on pre-selected frequencies to be attenuated by a final construction material, and wherein the proportion of each mass core particle is selected based on a predetermined desired level of attenuation at the corresponding resonant frequency.

21. The method of claim 17, further comprising foaming the matrix material by air- or gas-entrainment, blowing agents, polyurethane reactions, or vacuum application.

22. A sound attenuation material, comprising:

a plurality of particles, each comprising a core and an elastic or compliant coating uniformly distributed around the core; and a matrix surrounding the plurality of particles, wherein the core is denser than both the coating and the matrix, wherein the matrix is denser than the coating, and wherein both the coating and the matrix are foamed.

23. The sound attenuation material of claim 22, wherein the matrix comprises an elastic material.

24. The sound attenuation material of claim 22, wherein the coating is at least one of: dried by hot air, dried by moisture, cured by hot air, and cured by moisture.

25. The sound attenuation material of claim 1, wherein the coating is at least one of: dried by hot air, dried by moisture, cured by hot air, and cured by moisture.

\* \* \* \* \*